(12) United States Patent
Ishii

(10) Patent No.: US 10,097,736 B2
(45) Date of Patent: Oct. 9, 2018

(54) IMAGE PROCESSING DEVICE AND IMAGE PROCESSING METHOD

(71) Applicant: CANON KABUSHIKI KAISHA, Tokyo (JP)

(72) Inventor: Toshiyuki Ishii, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/626,626

(22) Filed: Jun. 19, 2017

(65) Prior Publication Data

US 2017/0374239 A1 Dec. 28, 2017

(30) Foreign Application Priority Data

Jun. 22, 2016 (JP) ................. 2016-123988

(51) Int. Cl.
  *H04N 1/60* (2006.01)
  *H04N 9/07* (2006.01)
  *H04N 5/225* (2006.01)
  *H04N 5/235* (2006.01)
  *H04N 5/232* (2006.01)

(52) U.S. Cl.
  CPC ......... *H04N 1/6086* (2013.01); *H04N 5/2256* (2013.01); *H04N 5/2351* (2013.01); *H04N 5/23238* (2013.01); *H04N 9/07* (2013.01); *H04N 2201/0084* (2013.01)

(58) Field of Classification Search
  CPC ............. H04N 5/23238; H04N 5/2256; H04N 1/6086; H04N 9/07
  See application file for complete search history.

(56) References Cited

U.S. PATENT DOCUMENTS

2005/0207671 A1* 9/2005 Saito .................... G06K 9/3283
                                                                  382/275
2017/0230584 A1* 8/2017 Du ...................... H04N 5/23293

FOREIGN PATENT DOCUMENTS

JP   2007-081580 A   3/2007
JP   2011-124954 A   6/2011

* cited by examiner

*Primary Examiner* — Christopher K Peterson
(74) *Attorney, Agent, or Firm* — Carter, DeLuca, Farrell & Schmidt, LLP

(57) ABSTRACT

An image processing device comprises a unit configured to obtain image data representing an image of an object from an image capturing device; a unit configured to obtain an angular dependency of an intensity of light reflected by the object; a unit configured to calculate an angle of the light reflected by the object to the image capturing device; and a unit configured to correct the obtained image data based on the calculated angle and the obtained angular dependency.

11 Claims, 10 Drawing Sheets

FIG. 1A
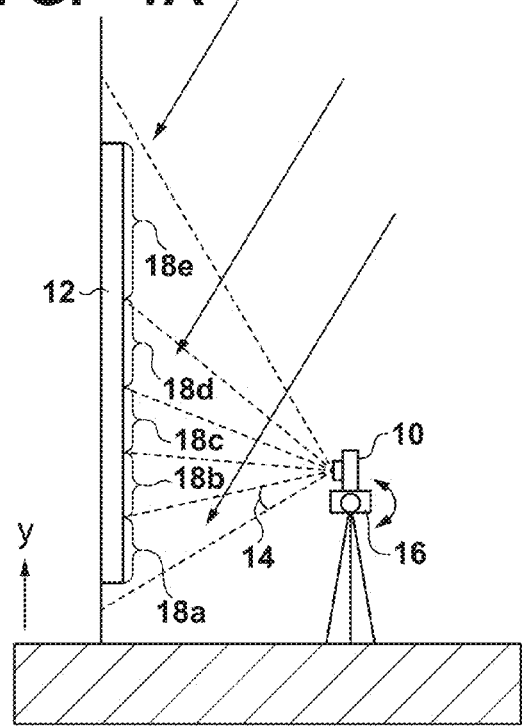
FIG. 1B
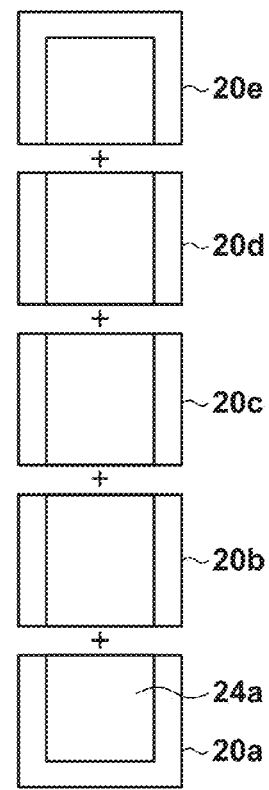
FIG. 1C
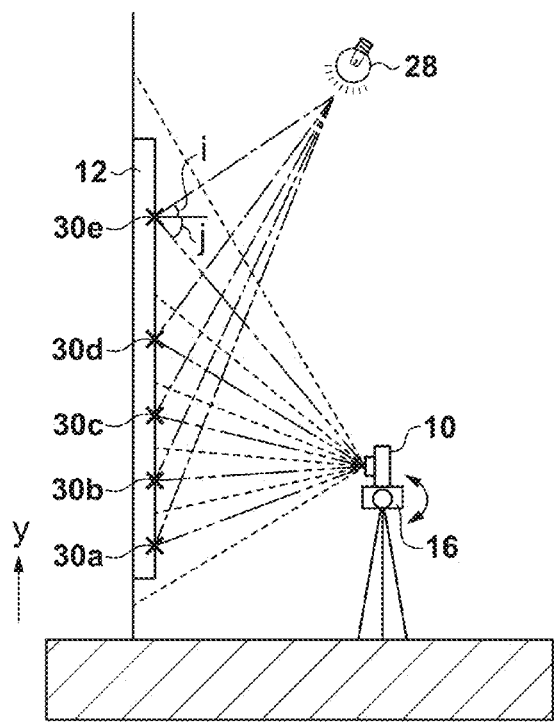
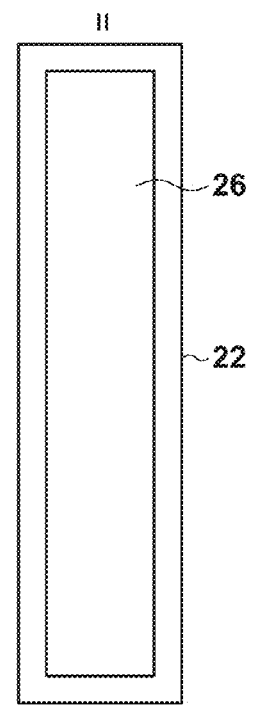

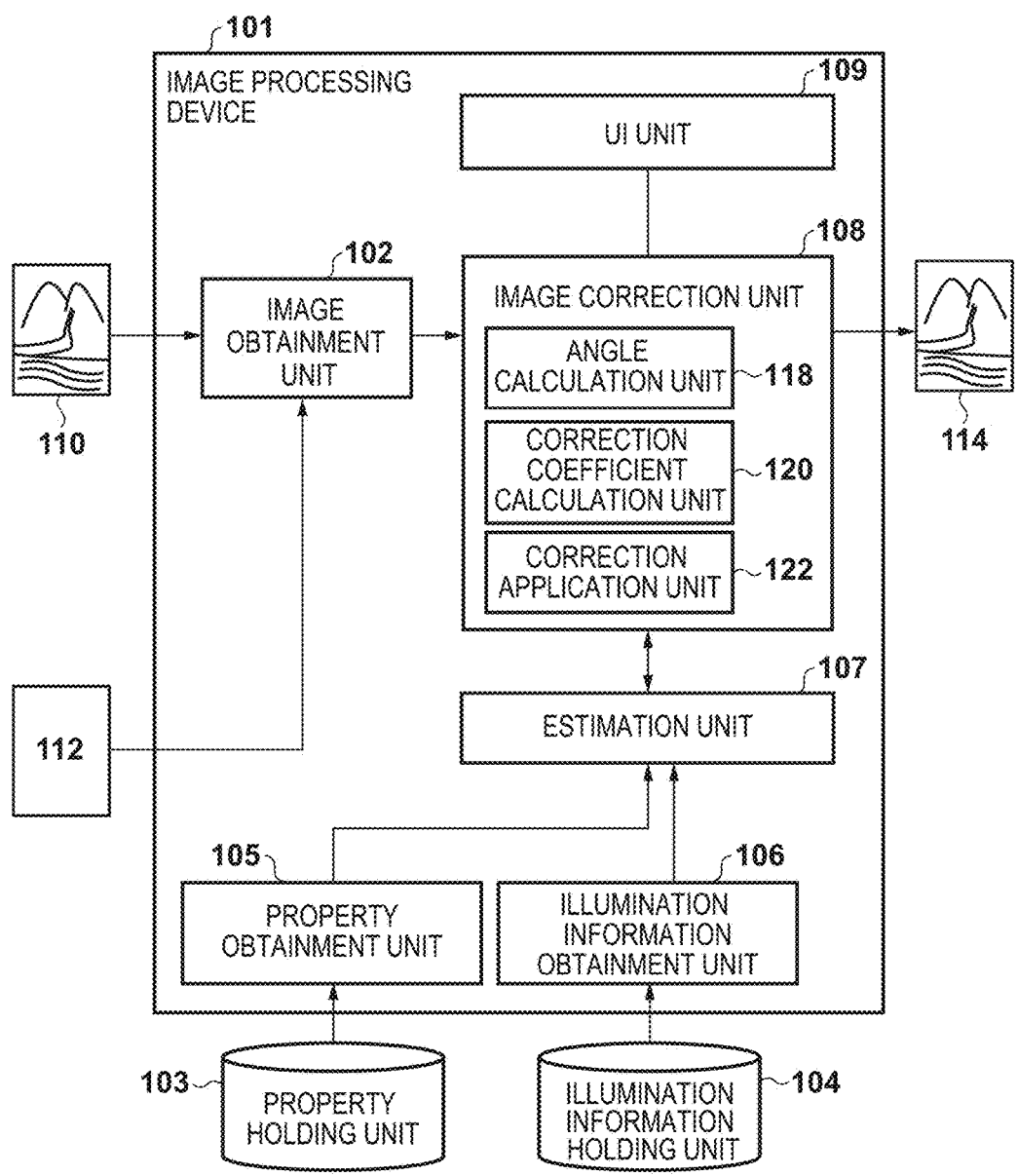

| COLOR ID | PHOTORECEPTION ANGLE : 1   45° | | | | |
|---|---|---|---|---|---|
| | NUMBER OF ANGLES OF INCIDENCE : 5 | | | | |
| | 30° | 40° | 50° | 60° | 70° |
| 1 | 98 | 87 | 65 | 55 | 50 |
| 2 | 86 | 83 | 72 | 62 | 57 |
| 3 | 84 | 80 | 50 | 42 | 30 |
| 4 | 82 | 67 | 42 | 30 | 22 |
| ... | ... | ... | ... | ... | ... |

| POSITION ID | ILLUMINATION ANGLE OF INCIDENCE $i$ | INCIDENCE INTENSITY |
|---|---|---|
| 1 | 45 | 300 |
| 2 | 50 | 232 |
| 3 | 55 | 183 |
| 4 | 60 | 141 |
| 5 | 65 | 98 |

FIG. 9

| COLOR ID | EXTRACTED COLORS | | | IMAGE COORDINATES | | IMAGE CAPTURING POSITION ID |
|---|---|---|---|---|---|---|
| | R | G | B | x | y | |
| 1 | 32 | 54 | 46 | 200 | 1300 | 1 |
| 2 | 120 | 133 | 145 | 1150 | 2200 | 1 |
| 3 | 202 | 201 | 190 | 560 | 2600 | 1 |
| 4 | 170 | 185 | 180 | 4250 | 560 | 2 |
| 5 | 64 | 80 | 95 | 965 | 1630 | 2 |
| ... | ... | | | ... | | |

IMAGE PROCESSING DEVICE AND IMAGE PROCESSING METHOD

BACKGROUND OF THE INVENTION

Field of the Invention

The present invention relates to an image processing device and an image processing method.

Description of the Related Art

Broadly there are two kinds of nonuniformities in captured images. Specifically, these are illumination-based nonuniformities that occur because an illuminant is irradiated unevenly on an object at a time of capturing, and visnetting-based nonuniformities due to lens properties wherein it gets darker as you go from the central portion towards peripheral portions the captured image. Since an illumination-based nonuniformity occurs when capturing is performed a plurality of times when the size of the object is larger than the angle of view at the time of capturing a single shot, illumination-based nonuniformities tend to be larger in the longitudinal direction in particular. Also, a visnetting-based nonuniformity occurs in every captured image.

A shading correction technique is a known technique for correcting nonuniformities that occur in a captured image. In a technique disclosed in Japanese Patent Laid-Open No. 2007-81580, for example, a color chart and an illumination-based nonuniformity correction chart are captured under the same illumination, and correction of the foregoing two types of nonuniformities is performed based on the captured values for both charts. Also, in the technique disclosed in Japanese Patent Laid-Open No. 2011-124954, flash image capturing and image capturing under observation light are performed, correction data for performing shading correction is generated based on a correspondence relationship between pixel values of an image that is flash image captured and pixel values captured under an observation light source, and then the correction is performed.

SUMMARY OF THE INVENTION

There are cases in which, if an object that is larger than the angle of view is captured, a plurality of images are captured, rotating in a pitch and roll or the like and changing the angle without moving the position of the camera. In such a case, a difference may occur in the way the nonuniformities appear between the object and the correction chart due to differences in a reflection property of the object and a reflection property of the correction chart. Accordingly, in a method of Japanese Patent Laid-Open No. 2007-81580 that performs shading correction under the assumption that the same nonuniformities will occur for the object and the correction chart, it is difficult to appropriately correct the nonuniformities that occur in the captured image of the object. Also, in the method of Japanese Patent Laid-Open No. 2011-124954, a color changing at a time of capturing an object due to the changing an angle is not considered. Additionally, because the visnetting-based nonuniformity that occurs in a captured image differs depending on the light source and the image capturing conditions, and therefore it is also difficult to appropriately correct illumination-based nonuniformities and visnetting-based nonuniformities in the method recited in Japanese Patent Laid-Open No. 2011-124954.

Embodiments of the present invention correct nonuniformities due to reflection properties of an object.

An embodiment of the present invention comprises the following configuration.

An image processing device comprising: a unit configured to obtain image data representing an image of an object from an image capturing device; a unit configured to obtain an angular dependency of an intensity of light reflected by the object; a unit configured to calculate an angle of the light reflected by the object to the image capturing device; and a unit configured to correct the obtained image data based on the calculated angle and the obtained angular dependency.

By virtue of illustrative embodiments of the present invention, it is possible to correct nonuniformities due to reflection properties of an object.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 1A, 1B and 1C are schematic views illustrating a relationship between an angle of view of a camera and an object.

FIG. 2 is a block diagram illustrating functions and configurations of an image processing device according to a first embodiment.

FIGS. 3A and 3B are data structure views illustrating an example of a property holding unit and an illumination information holding unit.

FIG. 9 is a data structure view illustrating an example of a color extraction file.

DESCRIPTION OF THE EMBODIMENTS

Figure 4A:
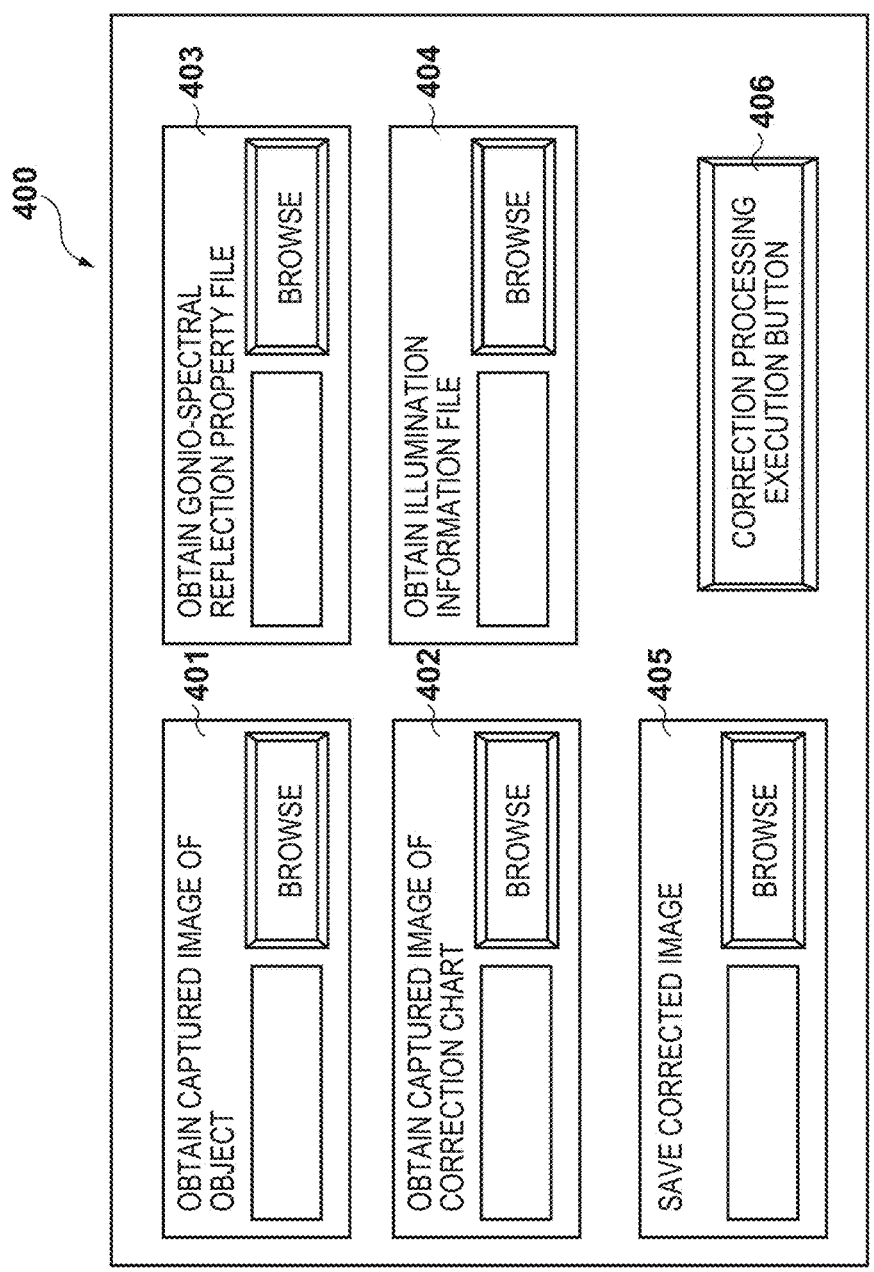
FIGS. 4A and 4B are representative screen views of user interfaces displayed by a UI unit.

Embodiments of the present invention will be described hereinafter, with reference to the drawings. Note that embodiments of the present invention are not limited to the embodiments below. Elements, components, and processes illustrated in the drawings that are the same or equivalent are given the same reference numerals, and duplicate descriptions thereof are omitted as appropriate. Also, portions of components that are not important to the description are abbreviated in the drawings.

FIG. 1A is a schematic diagram illustrating a relationship between an angle of view 14 and an object 12 of a camera 10. The object 12 may be something that is long such as a hanging scroll, a makimono, picture or the like. The object 12 is long in a longitudinal direction (a perpendicular direction, a vertical direction). The object 12 is larger than the angle of view 14 of the camera 10, which is an image capturing device, in the longitudinal direction. Thus, the camera 10 cannot capture the entirety of the longitudinal direction of the object 12 in one capturing. Therefore, by turning a panhead 16 on which the camera 10 is installed, a photographer changes the orientation of the camera 10 without changing the position of the camera 10 to capture the entirety of the object 12 over a number of times. Then, the photographer combines the plurality of obtained images (hereinafter referred to as a partial images) and generates an image which captures the entirety of the object 12 (hereinafter referred to as an entire image).

The camera 10 captures the object 12, changing the orientation four times from the bottom to the top to generate a total 5 partial images. This corresponds to the object 12 being divided into 5 in the longitudinal direction and each part being captured. The portion of the object 12 which fits into the angle of view 14 of the camera 10 is referred to as an angle of view portion. In the example of FIG. 1A, the object 12 is divided into 5 portions—angle of view portions 18a, 18b, 18c, 18d, and 18e—corresponding to the 5 orientations of the camera 10.

FIG. 1B is an explanatory view of combining a plurality of images. 5 partial images 20a, 20b, 20c, 20d, and 20e are obtained by capturing each of 5 angle of view portions 18a, 18b, 18c, 18d, and 18e. The photographer combines these 5 partial images 20a, 20b, 20c, 20d, and 20e to generate an entire image 22 which captures the entirety of the object 12. The partial image 20a includes a corresponding image 24a of the angle of view portion 18a. The same is true for other partial images. The entire image 22 includes an image 26 of the object 12.

In the example of FIG. 1A, the object 12 is illuminated by natural light such as daylight. Illumination conditions of the object 12 are substantially uniform under natural light. Thus, the intensity of the illumination light in the object 12 is equal (a constant independent of location), and the angle at which the illumination light is incident on the object 12 (hereinafter referred to as an illumination angle of incidence) is also equal. In this situation, there is substantially no illumination-based nonuniformity.

However, there is angular dependency (hereinafter referred to as a gonio-spectral reflection property) on the intensity of reflected light from the object 12. Therefore, by an influence of the gonio-spectral reflection property, even in conditions in which there is no illumination-based nonuniformity, luminance increases or decreases depending on the orientation of the angle of view 14 of the camera 10. This appears as a nonuniformity of luminance (hereinafter referred to as an angle-based nonuniformity) in the partial images and the entire image. In the image processing technique in accordance with this embodiment, an image is corrected so as to reduce or remove this angle-based nonuniformity.

In the case where the object 12 is captured indoors such as in a studio, because the object 12 is illuminated by an illumination source such as a fluorescent light or a light bulb, the intensity of the illumination light and the illumination angle of incidence become dependent on the position on the object 12. FIG. 1C is an explanatory view in the case when an illumination source 28, which is disposed at the position near to the object 12 is used instead of natural light in FIG. 1A. Positions at the center in the longitudinal direction of each of 5 angle of view portions 18a, 18b, 18c, 18d, and 18e are defined as the angle of view positions 30a, 30b, 30c, 30d, and 30e of the angle of view portions. The intensity of the illumination light and the illumination angle of incidence i at the angle of view position differ depending on the angle of view position. The angle of reflection j of the reflected light from the angle of view position to the camera 10 is also different depending on the angle of view position. Hereinafter, explanation will be given for a case in which illumination conditions of the object 12 are in this way not necessarily uniform. In such a case, both of the angle-based nonuniformity and illumination-based nonuniformity are considered.

(First Embodiment)

FIG. 2 is a block diagram illustrating functions and configurations of an image processing device 101 according to the first embodiment. The image processing device 101 comprises an image obtainment unit 102, a property obtainment unit 105, an illumination information obtainment unit 106, an estimation unit 107, an image correction unit 108, and a UI unit 109.

The image obtainment unit 102 obtains entire-image data that represents an entire image 110 of the object 12 from the camera 10. The entire-image data includes a plurality of pieces of partial image data in which each piece represents one of a plurality of partial images. Each partial image data is generated by capturing once in the camera 10. A photographer captures a correction chart to correct illumination-based nonuniformity by the camera 10 under illumination conditions corresponding to illumination conditions of the object 12, for example the same illumination conditions. The image obtainment unit 102 obtains from the camera 10 reference image data which represents a reference image 112 that is obtained by capturing the correction chart. The correction chart has the same size of the object 12 substantially, and the reference image 112 is generated by combining a plurality of partial images similarly to the entire image 110. The correction chart may also be a diffuse reflection board in which reflectivity is equal over the entire surface.

The property obtainment unit 105 obtains a gonio-spectral reflection property that is held in a property holding unit 103. The illumination information obtainment unit 106 obtains illumination information held in an illumination information holding unit 104. The estimation unit 107 estimates an intensity of reflected light according to an angle of reflected light (hereinafter referred to as gonio-spectral reflection intensity) based on the gonio-spectral reflection property obtained by the property obtainment unit 105 and the illumination information obtained by the illumination information obtainment unit 106.

The image correction unit 108 corrects the image data obtained by the image obtainment unit 102 based on the gonio-spectral reflection intensity obtained by the result of the estimation. The image correction unit 108 includes an angle calculation unit 118, a correction coefficient calculation unit 120, and a correction application unit 122. The angle calculation unit 118 calculates an angle of the reflected light (specifically the angle of reflection j) from the angle of view portion corresponding to partial image data to the camera 10, in each piece of partial image data included in the entire-image data obtained by the image obtainment unit 102. The correction coefficient calculation unit 120 calculates a correction coefficient for each angle of view portion. The correction application unit 122 corrects the partial image data using the corresponding correction coefficient. The image correction unit 108 puts together the corrected partial image data to generate corrected entire-image data, and outputs the result. The corrected entire-image data represents a corrected image 114.

The UI unit 109 displays a user interface for a photographer to perform processing instructions. The UI unit 109 may be configured by a monitor, a mouse, and a keyboard, or may be configured by a touch panel. Note that, because a hardware configuration of the image processing device 101 in accordance with this embodiment can be configured by publicly known technology such as a computer, a detailed explanation of the hardware is omitted.

FIG. 3A is a data structure view illustrating an example of the property holding unit 103. The property holding unit 103 holds the gonio-spectral reflection property of the object 12 which is the capturing target. The gonio-spectral reflection property defines a relationship between the angle of the reflected light and reflectivity. The property holding unit 103 describes the reflection property of the object 12 in accordance with a predetermined photoreception angle and an angle of incidence of illumination for each color, as a gonio-spectral reflection property. The photoreception angle of the reflected light is the angle of reflection j in FIG. 1C. The angle of incidence of the illumination is the illumination angle of incidence i in FIG. 1C. In the example described in FIG. 3A, the property holding unit 103 holds reflectivities corresponding to values of 5 angles of incidence for photoreception angle="45 degrees" and color ID="1" to specify a color. In this embodiment, to obtain a reflection properties, image data is generated in advance by using a predetermined illumination source, and capturing the object 12, changing to various pairs of angle of incidence and photoreception angle. The reflection property is calculated by using a value which is obtained by extracting a representative color value of the generated image data and converting it into a luminance value. Note that, configuration may be taken such that the property holding unit 103 is generated by measuring, in advance, a sample which approximates the object 12 or the gonio-spectral reflection property of the object 12 using a predetermined gonio-spectral measurement apparatus.

FIG. 3B is a data structure view illustrating an example of the illumination information holding unit 104. The illumination information holding unit 104 holds illumination information indicating illumination conditions of the object 12 for when the camera 10 captures the object 12 to generate the entire-image data. For example, the illumination information includes a distribution of the illumination angle of incidence i in relation to the positions on the object 12 and a distribution of the intensity of the illumination light at the positions on the object 12. In this embodiment, the illumination information holding unit 104 holds the illumination angle of incidence i and the incident intensity in association for each position on the object 12 as the illumination information. The position ID, which specifies a position on the object 12, indicates the image capturing position in the longitudinal direction when capturing the object 12 a plurality of times. For example, when divided capturing of the object 12 is performed dividing over 5 times in the longitudinal direction, the position ID is one of 1-5. The position ID specifies the angle of view positions 30a, 30b, 30c, 30d, and 30e in FIG. 1C. Numerical values measured at angle of view positions corresponding to each of the illumination angle of incidence i and the incident intensity are registered. The incident intensity indicates a luminance value of the illumination at a measurement point. Note that if an illumination-based nonuniformity in a latitudinal direction (leftward/rightward directions, horizontal direction) is large, the illumination information holding unit 104 may hold data of illumination-based nonuniformity in the latitudinal direction separately. Alternatively, the illumination information holding unit 104 may hold a result of estimating the illumination angle of incidence and the incident intensity for an arbitrary point from captured image data of an omnidirectional camera.

FIG. 4A is a representative screen view of a user interface 400 displayed by the UI unit 109. The user interface 400 is something by which a user inputs information necessary for image processing. The user interface 400 has 5 designation input units 401, 402, 403, 404, and 405 and an execution button 406. The designation input unit 401 is a region for designating an image in which the object 12 is captured. The designation input unit 402 is a region for designating an image in which a correction chart is captured. The designation input unit 403 is a region for designating a gonio-spectral reflection property of the object 12. The designation input unit 404 is a region for designating illumination information for an image capturing environment. The designation input unit 405 is a region for designating a file name when saving an image after correction. The execution button 406 is a correction process execution button for instructing that correction be performed in relation to captured image data of the object 12.

Operation of the image processing device 101 according to the foregoing configuration will now be described.

Figures 5A, 5B, 5C:
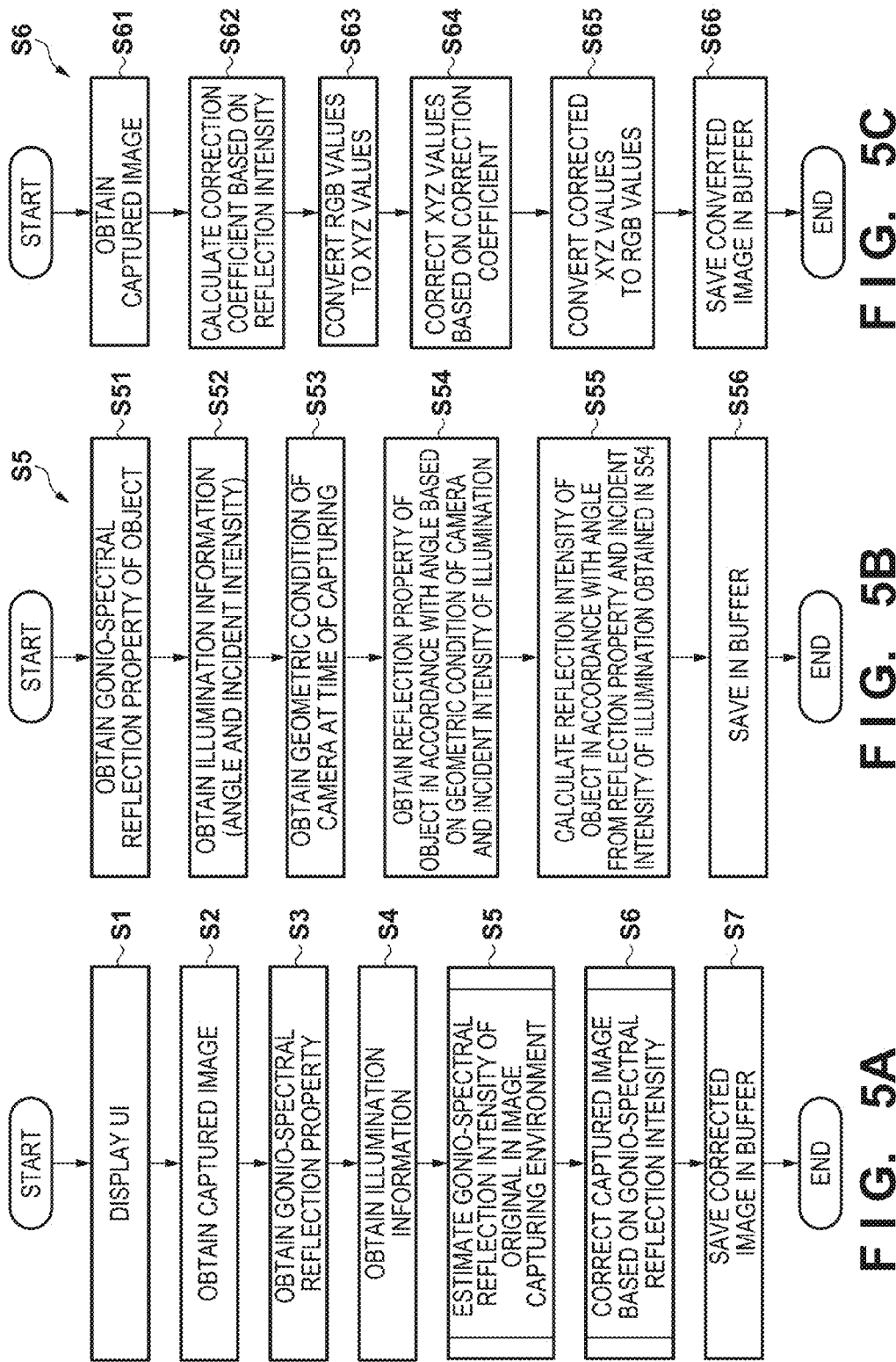
FIGS. 5A, 5B and 5C are flowcharts illustrating flows of a series of processes according to the image processing device of FIG. 2.

FIG. 5A is flowchart illustrating a flow of a series of processes in the image processing device 101 of FIG. 2. The process corresponding to this flowchart can be executed by, for example, one or more processors, functioning as the image processing device 101, executing a corresponding program (stored in a ROM or the like). In step S1, the UI unit 109 displays the user interface 400. In step S2, the image obtainment unit 102 obtains image data based on the image file names designated by the designation input unit 401 and the designation input unit 402. The obtained image data includes the entire-image data of the object 12 and correction chart reference image data. In step S3, the property obtainment unit 105 obtains a gonio-spectral reflection property from the property holding unit 103 based on the file name designated by the designation input unit 403. In step S4, the illumination information obtainment unit 106 obtains the illumination information from the illumination information holding unit 104 based on the file name designated by the designation input unit 404. In step S5, the estimation unit 107 estimates the gonio-spectral reflection intensity of the object 12 using the gonio-spectral reflection property obtained in step S3 and the illumination information obtained in step S4. Details of processing in the estimation unit 107 is described later. In step S6, the image correction unit 108 corrects angle-based nonuniformity and illumination-based nonuniformity that occur in the entire image 110 based the image data obtained in step S2 and the gonio-spectral reflection intensity estimated in step S5. Details of the processing of the image correction unit 108 are described later. In step S7, the image correction unit 108 outputs a corrected image that is corrected in step S6 to a buffer, and ends the processing by saving it in the buffer.

FIG. 5B is a flowchart illustrating a flow of processing executed in the estimation of step S5 of FIG. 5A. In step S51, the estimation unit 107 obtains the gonio-spectral reflection property obtained in step S3. In step S52, the estimation unit 107 obtains the illumination information obtained in step S4. In step S53, the estimation unit 107 obtains a geometric condition of the camera 10 when capturing. In this embodiment, the angle calculation unit 118 obtains angular data indicating how many degrees to rotate the camera 10 from the horizontal plane when capturing, from a control parameter of the dedicated panhead 16. The angle calculation unit 118 calculates the photoreception angle at each angle of view position on the object 12 from the obtained angular data. The estimation unit 107 obtains the photoreception angle for each angle of view position calculated by the angle calculation unit 118.

In step S54, the estimation unit 107 references the photoreception angle obtained in step S53 and the angle of incidence included in the illumination information obtained in step S52. The estimation unit 107 obtains reflection property data corresponding to a photoreception angle and angle of incidence pair that is closest to the referenced photoreception angle and angle of incidence pair from the gonio-spectral reflection property obtained in step S51. Note that the reflection property data corresponding to a photoreception angle and angle of incidence pair closest to the referenced the photoreception angle and angle of incidence pair is obtained in this embodiment, but limitation is not made to this. For example, configuration may be taken to obtain a reflection property of the object 12 in the image capturing environment by interpolation based on an angle from a reflection property of a photoreception angle and angle of incidence pair closest to the referenced photoreception angle and angle of incidence pair.

In step S55, the estimation unit 107 calculates the reflection intensity of each angle of view portion of the object 12 using the following Equation (1) from the illumination incident intensity and the reflection property obtained in step S54.

$$S(m_p) = E(m_p) \times I(m_p) \quad (1)$$

where $m_p$: coordinate (y-coordinate) in the longitudinal direction of the angle of view position specified by the position ID p $S(m_p)$: gonio-spectral reflection intensity of the object 12 at $m_p$ $E(m_p)$: change in gonio-spectral reflection of the object 12 at $m_p$ $I(m_p)$: illumination incident intensity at $m_p$ $E(m_p)$ is obtained in step S54 as a reflectivity corresponding to a pair closest to the photoreception angle and angle of incidence pair at the angle of view position specified by the position ID p. $I(m_p)$ is an incident intensity corresponding to the position ID p at the illumination information obtained in step S52. In step S56, the estimation unit 107 saves the gonio-spectral reflection intensity calculated in step S55 in the buffer and ends the processing.

For example, it is calculated that the photoreception angle is "45 degrees" by the angle calculation unit 118 for the angle of view position (hereinafter referred to as the first angle of view position) that the position ID "1" of FIG. 3B specifies. Similarly, it is calculated that the photoreception angle is "30 degrees" by the angle calculation unit 118 for the angle of view position (hereinafter referred to as the second angle of view position) that the position ID "2" specifies. The estimation unit 107 decides that the angle of incidence of the first angle of view position is "45 degrees" referring to illumination information equivalent to FIG. 3B. Similarly, the estimation unit 107 decides that the angle of incidence of the second angle of view position is "50 degrees". The estimation unit 107 specifies the closest pair from the first angle of view position (photoreception angle, angle of incidence)=(45 degrees, 45 degrees), referring to the gonio-spectral reflection property equivalent to FIG. 3A. For example, (45 degrees, 40 degrees) is specified. The estimation unit 107 obtains the first reflectivity corresponding to the specified pair. For example, (87%, 83%, 80%, 67%, . . . ) are obtained in order of color ID. Similarly, the estimation unit 107 obtains a second reflectivity for the second angle of view position. The estimation unit 107 calculates the gonio-spectral reflection intensity $S(m_1)$ at the first angle of view position as the product of the first reflectivity (=$E(m_1)$) and the incident intensity corresponding to the position ID "1" (=$I(m_1)$). Similarly, the estimation unit 107 calculates the gonio-spectral reflection intensity $S(m_2)$ at the second angle of view position as the product of the second reflectivity (=$E(m_2)$) and the incident intensity corresponding to the position ID "2" (=$I(m_2)$).

FIG. 5C is a flowchart illustrating a flow of processing executed in the correction of step S6 of FIG. 5A. In step S61, the image correction unit 108 obtains the image data obtained in step S2. In step S62, the correction coefficient calculation unit 120 of the image correction unit 108 calculates a correction coefficient for each angle of view portion of the object 12 using the Equation (2) below based upon the gonio-spectral reflection intensity estimated in step S5.

$$k(m_p) = \frac{S_{ave}}{S(m_p)} \times \frac{W(m_p)}{W_{ave}} \quad (2)$$

where $k(m_p)$: a correction coefficient at $m_p$ $S_{ave}$: average value of the gonio-spectral reflection intensity of the object 12 (average of the gonio-spectral reflection intensities at all position IDs p)

$W_{ave}$: average value of luminance values of the correction chart (average of all correction chart luminance values at the position ID p)

$W(m_p)$: luminance value of the correction chart at $m_p$

It is assumed that, in the example of the first angle of view position and the second angle of view position described above, the first reflectivity is less that the second reflectivity ($E(m_1) < E(m_2)$). Also, the incident intensity is assumed to be equivalent between the first angle of view position and the second angle of view position ($I(m_1) \approx I(m_2)$). Additionally, it is assumed that $W(m_1) \approx W(m_2)$. Thus, by Equation (1), $S(m_1) < S(m_2)$, and by Equation (2), $k(m_1)$ and $k(m_2)$ are set so that $k(m_1) > k(m_2)$. Specifically, the correction coefficient tends to become larger the smaller the reflectivity is.

At step S63, the correction application unit 122 of the image correction unit 108 converts the pixel values of the reference image data and the entire-image data obtained in step S61 from RGB values to XYZ values. In this embodiment, an sRGB conversion formula of Equation (3) below is used in the conversion from RGB values to XYZ values, but in another example, another conversion formula such as an Adobe RGB conversion formula may be used.

$$\begin{pmatrix} X \\ Y \\ Z \end{pmatrix} = \begin{pmatrix} 0.4124 & 0.3576 & 0.1805 \\ 0.2126 & 0.7152 & 0.0722 \\ 0.0193 & 0.1192 & 0.9505 \end{pmatrix} \begin{pmatrix} R \\ G \\ B \end{pmatrix} \quad (3)$$

Here, each pixel value of RGB is converted with $\gamma=2.2$.

In step S64, the correction application unit 122 corrects XYZ values using Equation (4) and Equation (5) below.

$$Y'(n) = k(n) \times Y(n) \times \frac{Yw_{ave}}{Yw(n)} \quad (4)$$

Where n: coordinate (y-coordinate) in the longitudinal direction in the entire image 110 or the reference image 112

$Y'(n)$: luminance value of the entire image 110 at the coordinate n k(n): correction coefficient at the coordinate n (calculated by linear interpolation based on the correction coefficient of the closest position coordinate, referencing the correspondence between the coordinate n and the position coordinate at the position ID p)

Y(n): luminance value of the entire image 110 prior to conversion at the coordinate n Yw(n): luminance value of the reference image 112 at the coordinate n $Yw_{ave}$: average value of the luminance values of all pixels of the reference image 112

$$X'(n) = Y'(n) \times a/b \quad (5)$$
$$Z'(n) = (X'(n)/a) - X'(n) - Y'(n)$$
$$a = \frac{X(n)}{(X(n) + Y(n) + Z(n))}$$
$$b = \frac{Y(n)}{(X(n) + Y(n) + Z(n))}$$

Note that while a method of calculating a correction coefficient from a correspondence between $m_p$, which indicates the position coordinate in the longitudinal direction, and the y-coordinate in the longitudinal direction of the entire image 110 in order to correct nonuniformities in the longitudinal direction is described in this embodiment, limitation is not made to this. For example, correction may be performed in two-dimensional coordinates by adding a latitudinal direction coordinate in addition to the longitudinal direction.

In step S65, the correction application unit 122 converts the XYZ values calculated in step S64 into RGB values using Equation (6) below which is an inverse conversion of the formula to convert from RGB to XYZ used in step S63.

$$\begin{pmatrix} R \\ G \\ B \end{pmatrix} = \begin{pmatrix} 3.2406 & -1.5372 & -0.4986 \\ -0.9689 & 1.8758 & 0.0415 \\ 0.0557 & -0.2040 & 1.0570 \end{pmatrix} \begin{pmatrix} X \\ Y \\ Z \end{pmatrix} \quad (6)$$

Here, each pixel value of RGB is converted with γ=1/2.2. Specifically, the inverse gamma correction of step S63 is performed.

In step S66, the correction application unit 122 verifies whether or not the foregoing correction was performed for all of the pixel values of the entire image 110 obtained in step S61, and ends the processing by outputting the converted image to a buffer and saving it.

By virtue of the image processing device 101 in accordance with this embodiment, it is possible to precisely correct angle-based nonuniformity that can occur in the entire image 110 because correction is performed based on the gonio-spectral reflection property of the object 12 at the time of correction of the image.

(Second Embodiment)

In the first embodiment, a method of correcting shading that occurs in the entire image 110 based on a gonio-spectral reflection property of the object 12 is described. In the second embodiment, the gonio-spectral reflection property of the object 12 is used when calculating a color correction coefficient for converting an image captured under a particular illumination source into an image captured under a different illumination source.

Figure 6A:
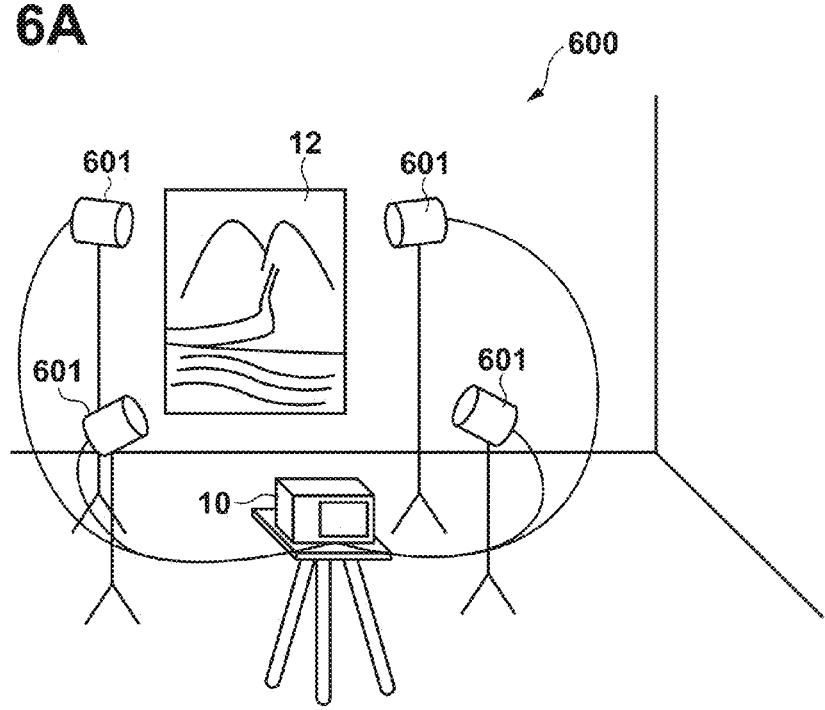
FIGS. 6A and 6B are schematic diagrams of an image capturing environment and an observation environment.

FIG. 6A is a schematic diagram of an image capturing environment 600. In the image capturing environment 600, the object 12 is captured by the camera 10 under the illumination of an illumination source for capturing (for example, a flash light-source 601 or the like). An image obtained by capturing the object 12 under the illumination of the flash light-source 601 is referred to as a capturing light source image, and that data is referred to as first entire-image data. The capturing light source image, as illustrated in FIG. 6A, is obtained by disposing a plurality of the flash light-source 601 around the object 12 so that no illumination-based nonuniformity occurs and then capturing the object 12. A correction chart is captured under the same illumination conditions as the object 12, and first reference image data is obtained thereby.

Figure 6B:
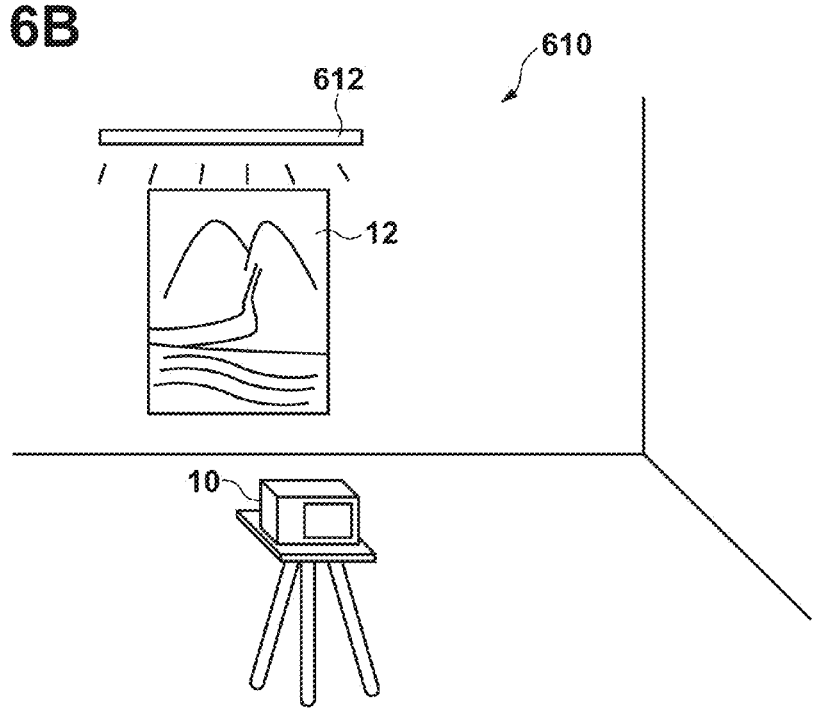

FIG. 6B is a schematic diagram of an observation environment 610. In the observation environment 610, the object 12 is captured by the camera 10 under the ambient light that is actually observed (for example, light from an observation light source 612 such as a fluorescent light fixed to a predetermined position such as the ceiling). An image obtained by capturing the object 12 under light from the observation light source 612 is referred to as an observation light source image, and that data is referred to as second entire-image data. Regarding the observation light source image, as illustrated in FIG. 6B, after making the positional relationship between the object 12 and the camera 10 the same as when the capturing light source image is captured, the illumination source is changed to the observation light source 612 and the object 12 is captured and obtained. The correction chart is captured under the same illumination conditions as the object 12, and second reference image data is obtained thereby.

Figure 7:
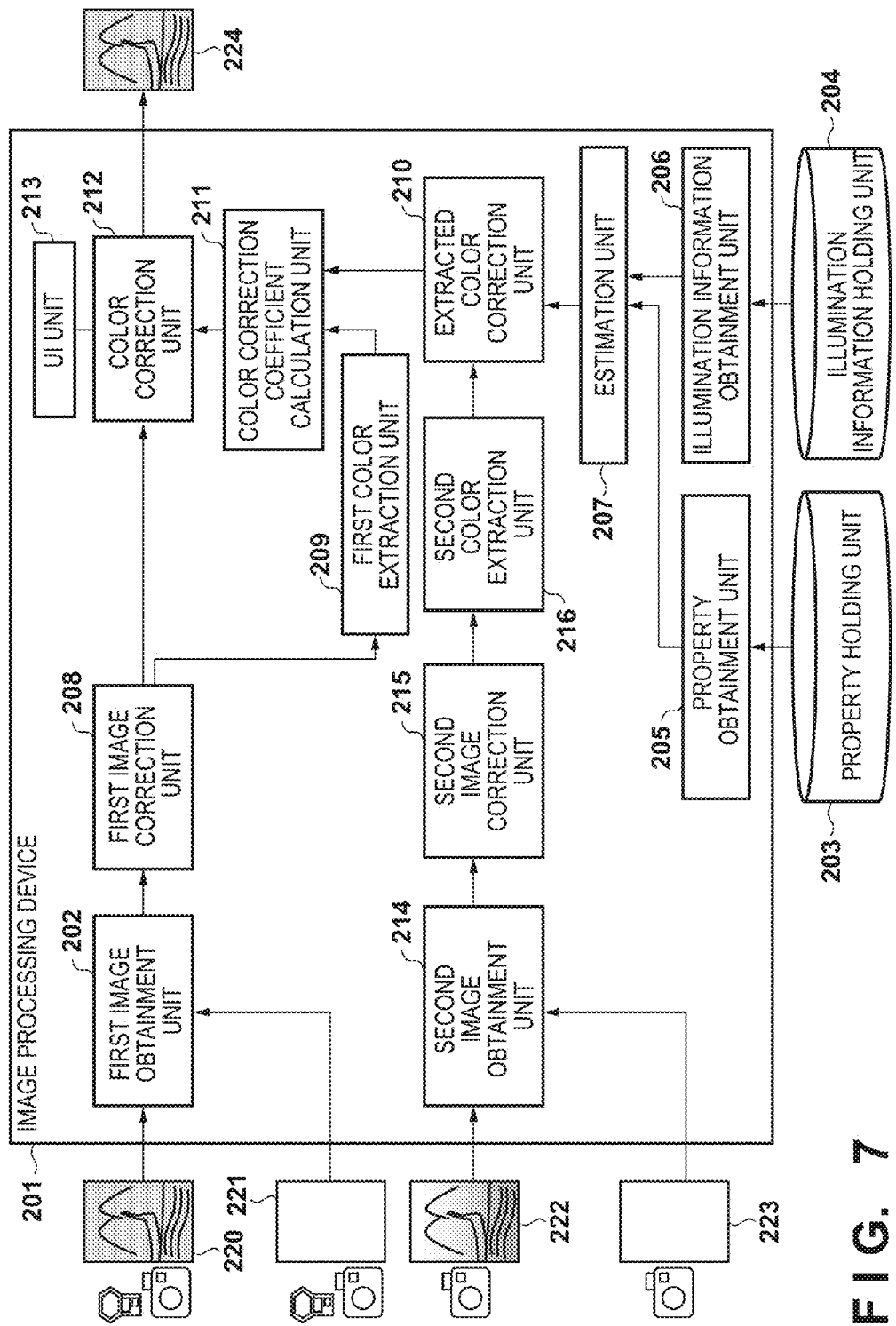
FIG. 7 is a block diagram illustrating functions and configurations of an image processing device according to a second embodiment.

FIG. 7 is a block diagram illustrating functions and configurations of an image processing device 201 according to the second embodiment. The image processing device 201 comprises a first image obtainment unit 202, a property obtainment unit 205, a illumination information obtainment unit 206, an estimation unit 207, a first image correction unit 208, a first color extraction unit 209, an extracted color correction unit 210, a color correction coefficient calculation unit 211, a color correction unit 212, a UI unit 213, a second image obtainment unit 214, a second image correction unit 215, and a second color extraction unit 216.

The first image obtainment unit 202 obtains the first entire-image data representing a capturing light source image 220 of the object 12 from the camera 10. The first image obtainment unit 202 further obtains from the camera 10 first reference image data which represents a first reference image 221 that is obtained by capturing the correction chart in the image capturing environment 600. The second image obtainment unit 214 obtains from the camera 10 second entire-image data representing an observation light source image 222 of the object 12. The second image obtainment unit 214 further obtains from the camera 10 second reference image data which represents a second reference image 223 that is obtained by capturing a correction chart in the observation environment 610.

The property obtainment unit 205 obtains a gonio-spectral reflection property that is held in a property holding unit 203. The illumination information obtainment unit 206 obtains illumination information held in an illumination information holding unit 204. The estimation unit 207 estimates gonio-spectral reflection intensity based on the gonio-spectral reflection property obtained by the property obtainment unit 205 and the illumination information obtained by the illumination information obtainment unit 206.

The first image correction unit 208 corrects shading that occurs in the capturing light source image 220 obtained by the first image obtainment unit 202. The second image correction unit 215 corrects shading that occurs in the observation light source image 222 obtained by the second image obtainment unit 214. The first color extraction unit 209 extracts a representative color value from the capturing light source image 220. The second color extraction unit 216 extracts a representative color value from the observation light source image 222. The extracted color correction unit 210 corrects the extracted color value based on the gonio-spectral reflection intensity. The color correction coefficient calculation unit 211 calculates a color correction coefficient based on the extracted color value. The color correction unit 212 corrects color values of the capturing light source image 220 using the color correction coefficient.

The UI unit 213 displays a user interface for a photographer to perform processing instructions. The UI unit 109 may be configured by a monitor, a mouse, and a keyboard, or may be configured by a touch panel. Note that, because a hardware configuration of the image processing device 201 in accordance with this embodiment can be configured by publicly known technology such as a computer, a detailed explanation of the hardware is omitted.

Figure 4B:
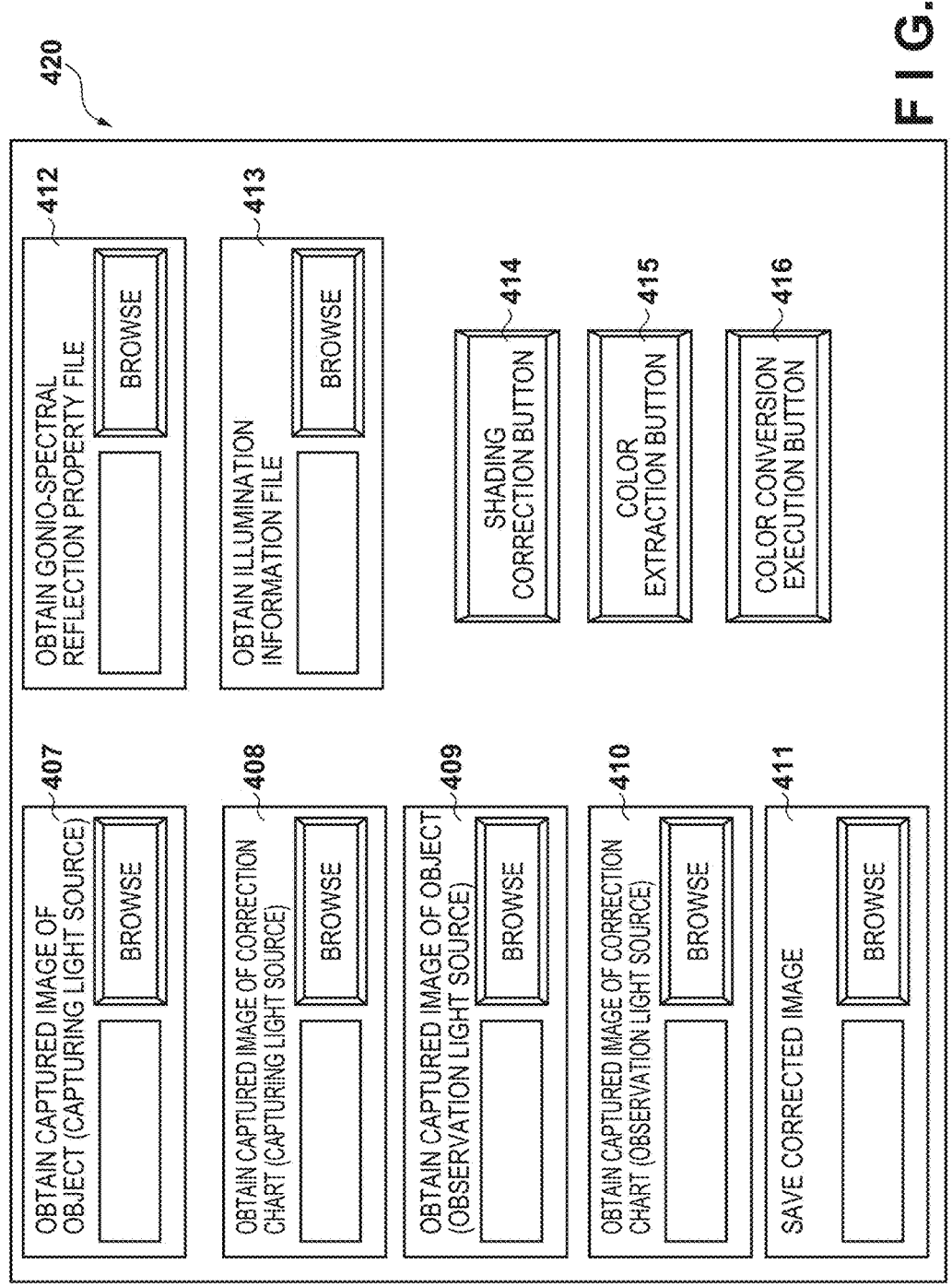

FIG. 4B is a representative screen view of a user interface 420 displayed by the UI unit 213. The user interface 420 is something by which a user inputs information necessary for image processing. The user interface 420 has 7 designation input units 407, 408, 409, 410, 411, 412, and 413 and three buttons 414, 415, and 416. The designation input unit 407 is a region for designating an image in which the object 12 is captured in the image capturing environment 600. The designation input unit 408 is a region for designating an image in which the correction chart is captured in the image capturing environment 600. The designation input unit 409 is a region for designating an image in which the object 12 is captured in the observation environment 610. The designation input unit 410 is a region for designating an image in which the correction chart is captured in the observation environment 610. The designation input unit 411 is a region for designating a file name when saving an image after image conversion. The designation input unit 412 is a region for designating a gonio-spectral reflection property of the object 12. The designation input unit 413 is a region for designating illumination information for an image capturing environment. A correction button 414 is a button for instructing that a shading correction be performed in relation to data of the capturing light source image 220 of the object 12. An extract button 415 is a button for instructing that a representative color value be extracted from the shading-corrected image. An execution button 416 is a button for accepting an instruction for converting a tint of the shading-corrected image captured in the image capturing environment 600 to a tint in the observation environment 610.

Operation of the image processing device 201 according to the foregoing configuration will now be described.

Figures 8A, 8B:
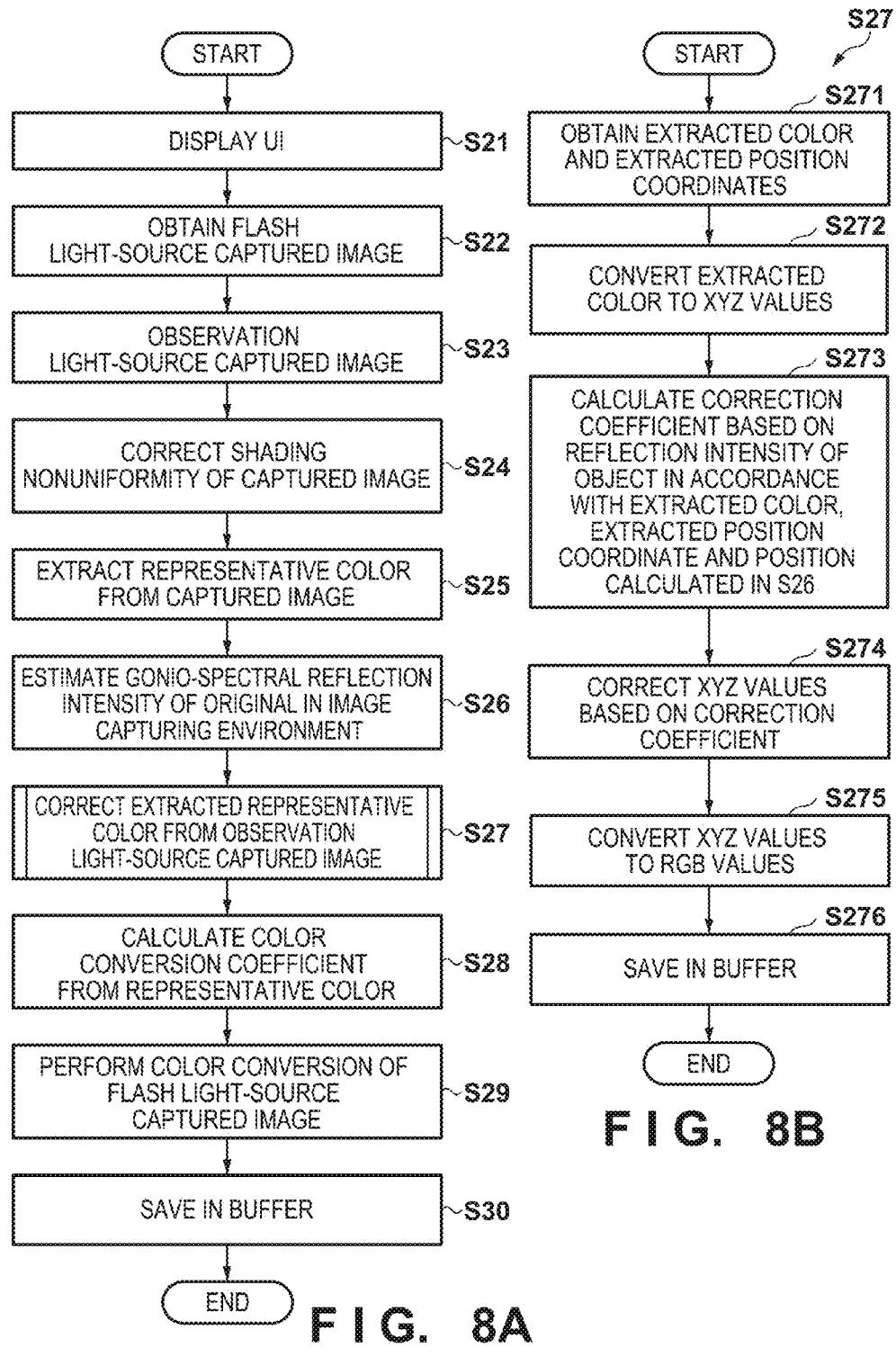
FIGS. 8A and 8B are flowcharts illustrating flows of a series of processes according to the image processing device of FIG. 7.

FIG. 8A is flowchart illustrating a flow of a series of processes in the image processing device 201 of FIG. 7. In step S21, the UI unit 213 displays the user interface 420. In step S22, the first image obtainment unit 202 obtains image data based on the image file names designated by the designation input unit 407 and the designation input unit 408. The obtained image data includes the first entire-image data of the object 12 and the first reference image data. In step S23, the second image obtainment unit 214 obtains image data based on the image file names designated by the designation input unit 409 and the designation input unit 410. The obtained image data includes the second entire-image data of the object 12 and the second reference image data. In step S24, the first image correction unit 208 and the second image correction unit 215 perform shading correction using Equation (7) below for the entire-image data obtained in step S22 and in step S23.

$$X'_{sample}(x, y) = \frac{X_{chart\_ave}}{X_{chart}(x, y)} \times X_{sample}(x, y) \quad (7)$$

$$Y'_{sample}(x, y) = \frac{Y_{chart\_ave}}{Y_{chart}(x, y)} \times Y_{sample}(x, y)$$

$$Z'_{sample}(x, y) = \frac{Z_{chart\_ave}}{Z_{chart}(x, y)} \times Z_{sample}(x, y)$$

where $X'_{sample}(x, y)$: the X value after correction in the entire image at the coordinates (x, y)

$Y'_{sample}(x, y)$: the Y value after correction in the entire image at the coordinates (x, y)

$Z'_{sample}(x, y)$: the Z value after correction in the entire image at the coordinates (x, y)

$X_{sample}(x, y)$: the X value before correction in the entire image at the coordinates (x, y)

$Y_{sample}(x, y)$: the Y value before correction in the entire image at the coordinates (x, y)

$Z_{sample}(x, y)$: the Z value before correction in the entire image at the coordinates (x, y)

$X_{chart}(x, y)$: the X value in the reference image of the coordinates (x, y)

$Y_{chart}(x, y)$: the Y value in the reference image of the coordinates (x, y)

$Z_{chart}(x, y)$: the Z value in the reference image of the coordinates (x, y)

$X_{chart\_ave}$: the average value of the X values of all pixels of the reference image $Y_{chart\_ave}$: the average value of the Y values of all pixels of the reference image $Z_{char\_ave}$: the average value of the Z values of all pixels of the reference image In step S25, the first color extraction unit 209 and the second color extraction unit 216 respectively extract representative color values from the entire image corrected by the first image correction unit 208 and the second image correction unit 215 in step S24. The method recited in, for example, Japanese Patent No. 5517685 may be used as the method for extracting the color values.

In step S26, the estimation unit 207 estimates the gonio-spectral reflection intensity from the illumination information and the gonio-spectral reflection property of the object 12 by a method conforming to the method described in the first embodiment. In step S27, the extracted color correction unit 210 corrects the color values extracted in step S25 based on the gonio-spectral reflection intensity estimated in step S26. Details of processing in the extracted color correction unit 210 are described later. In step S28, the color correction coefficient calculation unit 211 calculates the color correction coefficient for performing a light source conversion of the capturing light source image 220, using the color values corrected in step S27. The color correction coefficient is a coefficient for converting the image captured in the image capturing environment 600 into a tint depending on the observation environment 610, and in this embodiment, it is a 3×9 matrix indicated in Equation (8) below. Each element of this matrix is calculated using, for example, a least-squares method from a pixel value of a representative color of the image captured in the image capturing environment 600 and a pixel value of a representative color of the image captured in the observation environment 610 that is corrected in step S26. Note that because the least-squares method is a publicly known technique, description thereof is omitted.

$$\begin{pmatrix} a_{11} & a_{12} & a_{13} & a_{14} & a_{15} & a_{16} & a_{17} & a_{18} & a_{19} \\ a_{21} & a_{22} & a_{23} & a_{24} & a_{25} & a_{26} & a_{27} & a_{28} & a_{29} \\ a_{31} & a_{32} & a_{33} & a_{34} & a_{35} & a_{36} & a_{37} & a_{38} & a_{39} \end{pmatrix} \quad (8)$$

In step S29, the color correction unit 212, using a color correction coefficient calculated in step S28, converts the color values of the capturing light source image 220 captured using the flash light-source 601 after shading correction. Conversion is performed using Equation (9) below. In Equation (9), R, G, and B are pixel values of each pixel of the capturing light source image 220, and R', G', and B' are pixel values after conversion by the color correction coefficient.

$$\begin{pmatrix} R' \\ G' \\ B' \end{pmatrix} = \begin{pmatrix} a_{11} & a_{12} & a_{13} & a_{14} & a_{15} & a_{16} & a_{17} & a_{18} & a_{19} \\ a_{21} & a_{22} & a_{23} & a_{24} & a_{25} & a_{26} & a_{27} & a_{28} & a_{29} \\ a_{31} & a_{32} & a_{33} & a_{34} & a_{35} & a_{36} & a_{37} & a_{38} & a_{39} \end{pmatrix} \begin{pmatrix} R \\ G \\ B \end{pmatrix} \quad (9)$$

In step S30, the color correction unit 212 outputs the light-source-converted image 224 to a buffer, and ends the processing by saving it.

FIG. 8B is a flowchart illustrating a flow of processing executed in the correction of step S27 of FIG. 8A. In step S271, the extracted color correction unit 210 obtains a color extraction file 900 generated by extracting a representative color value from the entire image in step S25.

FIG. 9 is a data structure view illustrating an example of the color extraction file 900. In the color extraction file 900, an R value, a G value, and a B value indicating extracted color pixel values; image coordinates; and a position ID indicating an image capturing position in a longitudinal direction are held in association for each color ID of the colors extracted from the entire image.

Returning to FIG. 8B, in step S272, the extracted color correction unit 210 converts the R value, the G value, and the B value obtained in step S271 to XYZ values using a predetermined conversion formula such as an sRGB conversion formula. In step S273, the extracted color correction unit 210 calculates the correction coefficient by Equation (2) based on a position coordinate obtained step S271 and on the gonio-spectral reflection intensity calculated in step S26. In step S274, the extracted color correction unit 210 corrects the XYZ values of the conversion of step S272 using Equation (4) and Equation (5) based on the position coordinate obtained in step S271. In step S275, the extracted color correction unit 210 converts the XYZ values corrected in step S274 into RGB values using an sRGB inverse conversion equation. In step S276, the extracted color correction unit 210 saves the values of the extracted color that is corrected in a buffer and ends the process.

By virtue of the image processing device 201 in accordance with this embodiment, an effect similar to the effect achieved by the image processing device 101 in accordance with the first embodiment is achieved. In addition, by virtue of the second embodiment, it is possible to perform a good precision color conversion by performing a color value correction based on the gonio-spectral reflection property of the object when converting the tint of the entire image under a particular light source into a tint under another light source.

The above is a description of configuration and operation of an image processing device according to embodiments. These embodiments are only examples, and it should be understood by those skilled in the art that various variations that combine the elements and processes are possible, and that such variations fall within the scope of the present invention.

In the first and second embodiments, cases in which a diffuse reflection board is used as a correction chart are described, but limitation is not made to this, and a reference object for which an optical property such as reflectivity is known beforehand may also be used.

In the first and second embodiments, cases in which partial images are combined into an entire image, and entire-image data that represents that entire image is corrected are described, but limitation is not made to this. For example, the image processing devices 101 and 201 may correct image data representing an image obtained by a single capturing by the camera 10.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-123988, filed Jun. 22, 2016, which is hereby incorporated by reference herein in its entirety.

What is claimed is:

1. An image processing device comprising:
one or more processors; and
a memory having stored thereon instructions, which, when executed by the one or more processors, causes the image processing device to:
obtain image data representing an image of an object from an image capturing device;
obtain an angular dependency of an intensity of light reflected by the object;
calculate an angle of the light reflected by the object to the image capturing device; and
correct the obtained image data based on the calculated angle and the obtained angular dependency.

2. The image processing device according to claim 1, wherein the image data is corrected to reduce an influence on the obtained image data, according to the angular dependency of the intensity of the light reflected by the object.

3. The image processing device according to claim 2, wherein a first angle and a second angle are calculated for a first portion and a second portion of the object, respectively,
wherein the angular dependency of the intensity of the light reflected from the object defines a relationship between a reflectivity and an angle of reflected light, and
wherein, in a case where a first reflectivity corresponding to the first angle and a second reflectivity corresponding to the second angle are specified and the specified first reflectivity is less than the specified second reflectivity, a first correction coefficient corresponding to the first portion is set to be larger than a second correction coefficient corresponding to the second portion.

4. The image processing device according to claim 1, wherein the obtained image data includes a plurality of pieces of partial image data corresponding to different portions of the object, respectively, and
wherein each piece of partial image data is generated by a single capture in the image capturing device.

5. The image processing device according to claim 1, wherein the angular dependency includes a relationship between a reflectivity and an angle of reflection of light reflected from the object.

6. The image processing device according to claim 1, wherein the instructions, when executed by the one or more processors, further cause the image processing device to:
obtain illumination information indicating an illumination condition of the object at a time when the image capturing device generates the image data by capturing the object; and
estimate an intensity of reflected light according to an angle of reflected light based on the angular dependency of the intensity of the light reflected by the object and the obtained illumination information,
wherein the obtained image data is corrected based on the calculated angle and the intensity of reflected light according to the angle of reflected light obtained as the result of the estimation.

7. The image processing device according to claim 6, wherein reference image data is obtained by capturing a reference object that has a known optical property by the image capturing device under an illumination condition corresponding to an illumination condition of the object, and
wherein the obtained image data is corrected using the obtained reference image data.

8. The image processing device according to claim 6, wherein the illumination information includes at least one of a distribution of an angle at which illumination light is incident on the object and a distribution of intensity of illumination light on the object.

9. The image processing device according to claim 6, wherein the instructions, when executed by the one or more processors, further cause the image processing device to:
calculate a color correction coefficient for converting a color value depending on the illumination condition into a color value depending on another illumination condition;
perform a color conversion in relation to the obtained image data using the calculated color correction coefficient; and
correct, based on the angular dependency of the intensity of the light reflected from the object, a color value used when the color correction coefficient is calculated.

10. An image processing method, comprising:
obtaining image data representing an image of an object from an image capturing device;
obtaining an angular dependency of an intensity of light reflected by the object;
calculating an angle of the light reflected by the object to the image capturing device; and
correcting the obtained image data based on the calculated angle and the obtained angular dependency.

11. A non-transitory computer-readable storage medium storing a computer program for causing a computer to execute an image processing method, the method comprising:
obtaining image data representing an image of an object from an image capturing device;
obtaining an angular dependency of an intensity of light reflected by the object;
calculating an angle of the light reflected by the object to the image capturing device; and
correcting the obtained image data based on the calculated angle and the obtained angular dependency.

* * * * *